United States Patent [19]

Torbus et al.

[11] Patent Number: 4,929,649

[45] Date of Patent: May 29, 1990

[54] COLD-SETTING MOULDING BINDERS AND THEIR USE (PHENOLS AND GASEOUS ACETALS)

[75] Inventors: Marek Torbus; Franz Jerman, both of Düsseldorf; Gerard Ladegourdie, Kaarst; Dirk Lingemann, Neuss; Willi Seiss, Neuss-Allerheiligen; Aleksandar Vujevic, Ratingen, all of Fed. Rep. of Germany

[73] Assignee: Huttenes-Albertus Chemische Werke GmbH, Dusseldorf-Heerdt, Fed. Rep. of Germany

[21] Appl. No.: 228,931

[22] PCT Filed: Nov. 7, 1987

[86] PCT No.: PCT/EP87/00691

§ 371 Date: Jul. 13, 1988

§ 102(e) Date: Jul. 13, 1988

[87] PCT Pub. No.: WO88/03847

PCT Pub. Date: Jun. 2, 1988

[30] Foreign Application Priority Data

Nov. 20, 1986 [DE] Fed. Rep. of Germany ....... 3639233

[51] Int. Cl.$^5$ .............................................. C08J 61/10
[52] U.S. Cl. .................... 523/145; 523/146; 524/596; 164/15; 264/82
[58] Field of Search ............... 523/145, 146; 524/596; 164/15; 264/82

[56] References Cited

U.S. PATENT DOCUMENTS

| | | | |
|---|---|---|---|
| 4,287,092 | 9/1981 | Stewart et al. | 523/145 |
| 4,584,340 | 4/1986 | Chi | 524/596 |

FOREIGN PATENT DOCUMENTS 2726423 12/1977 Fed. Rep. of Germany ...... 524/596

Primary Examiner—John Kight, III
Assistant Examiner—C. Azpuru
Attorney, Agent, or Firm—Dressler, Goldsmith, Shore, Sutker & Milnamow, Ltd.

[57] ABSTRACT

The binder serves to produce foundry moulds and comprises a solution (preferably an aqueous solution) of aldehyde reactive phenol substances and gaseous acetals (preferably dimethyl formal) as reaction partners and strong acids, e.g. sulphuric acid and sulphonic acids as a catalyst. The acetal is in this system hydrolysed by the acid, the basic aldehyde being formed, which will react with the aldehyde reactive phenol substance accompanied by cross-linking. The acid serves thereby simultaneously as a cross-linking catalyst. In principle, it is possible to regard as "aldehyde reactive phenol substances" any phenolic compounds which can in the acid range cross-link more or less spontaneously with aldehydes. Preferably, these are resorcinol or resorcinol products, e.g. resorcinol pitch or precondensates formed with a shortfall of aldehyde, e.g. based on resorcinol formaldehyde, phenol resorcinol formaldehyde or resorcinol melamine formaldehyde.

To produce foundry moulds, a granular basic moulding material, e.g. sand, the solution of the aldehyde reactive phenol substance and the acid are used to produce a moulding mixture which is then caused to set by passing the gaseous acetal (formal) through it. The aldehyde cross-linking of the aldehyde raective phenol substance in the acid medium, the process which takes place thereby, produces duroplasts (resites), which combine a very good thermal resistance and a low pollutants emission during casting with a high strength and negligible sensitivity to moisture in the mouldings produced, features which make them extremely favorable.

10 Claims, No Drawings

COLD-SETTING MOULDING BINDERS AND THEIR USE (PHENOLS AND GASEOUS ACETALS)

Where the manufacture of foundry mouldings is concerned, cold-setting binders have acquired increasing importance. In comparison with thermosetting binders, they offer marked advantages, particularly higher productivity for better working conditions and lower energy consumption. Without exception, these cold-setting binders consist of a cross-linkable reaction system which is processed with a basic mould material (e.g. quartz sand, zirconium sand, chromite sand or mixtures thereof) to produce a moulding mixture, a catalyst then assisting it to react to produce a solid highly cross-linked polymer. The catalyst is thereby in many cases added to the finished moulded mixture as a gas, but it can however also be worked into the moulding mixture together with the reaction system.

Typical examples of foundry working procedures using cold-setting binders are, if a gaseous catalyst is supplied, the coldbox process (isocyanate cross-linking of polyols with the action of gaseous tertiary amines), the $SO_2$ process, the $CO_2$ process or the formiate process, and if the catalyst is worked into the moulding mixture, the pepset process (isocyanate cross-linking of polyols under the action of higher amines). Of these, the coldbox process has been the most widely used for about 20 years. In this time, it has undergone constant improvement, but still suffers from a number of largely unavoidable disadvantages, some of which go back to the fact that the polyurethane formed during the cross-linking state is a thermoplast which has a relatively low thermal resistance and a relatively high pollutant emission during casting and is also very sensitive to moisture. In addition, the so-called "sand lifetime", i.e. the period of time during which a moulding mixture remains workable, is relatively short, the use of old sands is problematic and the polyols must be dissolved in organic solvents. The other cold-setting processes are by virtue of even greater disadvantages, less widely used in practice, because in the case of the formiate process, the strengths attainable are too low, while the $SO_2$ process, the problematical handling of peroxides and $SO_2$ gas speak against greater usage and the $CO_2$ process is adversely influenced by low productivity and very poor disintegrating capacity of the mouldings after casting.

Therefore, in the foundry industry there is as ever a need for a binder having improved properties. The invention satisfies this need and provides practice with an improved binder, which is according to the invention characterised in that it comprises a solution of aldehyde-reactive phenol substances and gaseous acetals as reaction partners and strong acids as catalysts, the phenol substances and the acids being laid down in the mixture of moulding mixture, the acetals being added to the shaped moulding mixture.

It is well known that an aldehyde reactive phenol substance can in the presence of an aldehyde (preferably formaldehyde), by the addition of a strong acid, be brought to harden out while cold and it is furthermore known that acetals can indeed remain stable in the alkaline range but will, however, in the acid range easily hydrolyse into the corresponding alcohols and aldehydes. With the invention, these two facts are brought into connection with each other and are suitably used to provide a novel binder in that a moulding mixture containing the phenol substance and the acid is, after removal of the mould, gasified with a gaseous acetal acting as an aldehyde donor. The acid has thereby a dual function, it brings about hydrolysis of the acetal and at the same time catalyses the cross-linking of the phenol substance by the aldehyde released from the acetal. It has been found that in this way a binder having properties which are surprisingly good in every respect and offering manifold advantages can be obtained, these advantages extending both to the manufacture and handling of the moulding mixture and also to the mould parts and their use in the casting process. Therefore, the binder is predestined for use in the production of foundry mould parts.

The advantageous properties of the hardened mould parts are substantially derived from the fact that the aldehyde cross-linking of the aldehyde-reactive phenol substances in the acid medium produces duroplasts. Thus, the mould parts produced using the binders according to the invention have high strength properties and in particular also good initial strength properties and negligible sensitivity to moisture which means they can be stored without problem. Furthermore, they have a very good thermal resistance. In addition, the pollutants emission after casting is extremely low and troublesome distillation gases virtually no longer occur. Also, the disintegrating properties of the mould parts after casting are very good so that no special expenditure is required in order to remove the castings from their moulds.

Within the framework of the invention, "aldehyde-reactive phenol substances" are all those compounds comprising phenolic OH-groups—individually or in mixture with one another—which are in a position with aldehydes in an acid medium to react more or less spontaneously subject to cross-linking. Particularly, this term should be understood as including phenol, aldehyde substituted and/or hydroxy substituted phenols, naphthols, bis-phenols, etc., as well as the precondensates formed therefrom with a shortfall of aldehyde (preferably formaldehyde). These precondensates are soluble products resistant in an acid medium which harden out only after the supply of further aldehyde emanating from the acetal. In comparison with the non-precondensed phenol substances, they offer the advantage of a greater rate of hardening for a lower acetal consumption and normally produce higher strength properties in the hardened-out mould parts. The aldehyde reactivity of phenol substances can easily be ascertained by simple hand tests so that the man skilled in the art can readily select a phenol substance which is suitable for the particular application.

The phenol substances are used in the form of a solution which will be referred to hereinafter as a "resin solution". In this respect, even water can be used as a solvent (possibly in mixture with non-aqueous solvents, particularly alcohols), which in comparison with the previously necessary organic solvents, is a considerable further advantage and which is therefore preferable. Accordingly, also the aldehyde reactive phenol bodies are preferably water soluble or water-diluable products. The solids content of the resin solution ought not to be too low in order to guarantee adequate strength in the mouldings produced. Solids contents of about 50 to 95% by weight have proved to be expedient, the upper limit being determined by the solubility or diluability of the phenol substances, but also being dependent upon the viscosity of the resin solution, because too high a viscosity makes it difficult to achieve an even distribution during mixture into this blend of moulding substances. The resin solution can be used in the quantities normally employed in foundry technology, of about ½ to 3% by weight in relation to the moulding mixture.

Resorcinol or resorcinol products have proved to be particularly suitable phenol substances, for example the resorcinol pitch occurring during resorcinol distillation or a water soluble precondensate (with a shortfall of formaldehyde) on a base of resorcinol formaldehyde or even phenol resorcinol formaldehyde. Also, a part (up to about 40% by weight) of the resorcinol can be replaced by non-phenolic aldehyde reactive compounds which can react with formaldehyde to produce aminoplasts, particularly melamine and melamine-formaldehyde precondensates. Resorcinol and precondensates containing resorcinol react with formaldehyde to form highly cross-linked phenol resins, the reaction, even in the cold and with only a small addition of acid, leading to the resite stage without resols or resitols being isolated at intermediate stages. The resorcinol pitch which in comparison with resorcinol offers considerable economic advantages is likewise water soluble and also reacts to form non-fusible resites. Since, on the other hand, resite formation is the basis of thermosetting binders which are processed, for instance, by the hotbox process, the system according to the invention therefore, all in all, combines the advantages of the coldbox binder with those of the hotbox binder without having any of their disadvantages.

Where the acid is concerned, the best results in hardening out are achieved with sulphuric acid and/or sulphonic acids by themselves or in mixture with one another. Where sulphonic acids are concerned, particularly aromatic sulphonic acids such as phenol sulphonic acid, toluene sulphonic acid, benzol sulphonic acid, xylol sulphonic acid or cumol sulphonic acid can be considered, but also sulphonic acids such as methane sulphonic acid are not out of the question. The aromatic sulphonic acids such as phenol sulphonic acid can thereby also be reacted with formaldehyde in a shortfall to produce a precondensate which can be used in an aqueous solution, possibly with added sulphuric acid. In any case, the acid must be present in a sufficient quantity in the moulding mixture in order to be able to bring about hydrolysis of the acetal and hardening-out of the phenol substance but it ought not to be present in an unnecessary excess. A proportion of 1 part by weight of acid to 1 to 3 parts by weight of resin solution has been found to be expedient. The addition of the acid to the moulding mixture is preferably effected simultaneously with the addition of resin solution.

For gas absorption, preferably readily volatile acetals are used, particularly 1,3-dioxalane and also the acetals of formaldehyde termed "formals" with alcohol components up to 4 C-atoms. Typical examples are dimethyl formal, diethyl formal, di-n-propyl formal, diisopropyl formal, di-n-butyl formal, diisobutyl formal, di-tertiary butyl formal, etc., but even formals consisting of two different alcohols such as methyl ethyl formals, methyl isopropyl formal, ethyl isopropyl formal, etc., are suitable. These acetals, which may be used individually or in mixture with one another, have a pleasant smell and a relatively high MAK value, e.g. 1000 ppm MAK in the case of dimethyl formal).

It is also possible to admix with the resin solution or the moulding mixture containing it silanes, glycols or other conventional additives. Also, an addition of small quantities of aminoplasts, e.g. a melamine resin, may be expedient, which particularly in the case of monomeric phenol substances, act to a certain extent as "inoculation polymers".

The production of foundry mouldings, e.g. cores, is carried out using the binders according to the invention in that a basic mould material is blended with the resin solution and the acid to produce a moulding mixture which after being processed to the desired shape then is caused to harden by passing a vaporisable acetal (with, for example, air, $CO_2$ or nitrogen as a carrier gas) through it. This leads to extremely long sand lift times, because no longer as in the past the catalyst, but now a constituent part of the reactive system, is supplied via the gas, so that no noteworthy premature reactions can occur in the moulding mixture. Gas absorption can then be carried out in the same equipment as was developed, for instance, for the coldbox process, all that is necessary to remember being that the acetal remains in the gas phase and is not prematurely condensed. For this reason, it is expedient to keep the tools (core boxes) at a temperature of about 20° to 50° C. The formaldehyde given off during gas absorption in the moulding mixture provides for a split-second hardening and is consumed during the hardening-up process, so that it leaves no residues in the atmosphere. Since also there are preferably no organic solvents present, then all in all both during core production and also in storing the cores or storing the moulding mixture, there will be no annoyance of any kind due to smells.

The following examples explain the invention, "PW" denoting parts by weight.

EXAMPLE 1

30 PW resorcinol, 30 PW resorcinol pitch, 10 PW melamine resin (Kauramin 700 produced by Messrs. BASF) and 30 PW water were placed in a mixing vessel and blended to produce an aqueous solution which was further mixed with 0.2 %wt aminosilane (A 1100 of Messrs. Union Carbide). This solution will be subsequently referred to as "resin solution 1").

From 100 PW quartz sand H 33, 1.5 PW resin solution 1 and 0.5 PW sulphuric acid (96%), a moulding mixture was produced and, by reason of the lower viscosity of the two sand additives, conventional high-speed mixers were used as the mixing equipment. Rather like the coldbox process, to DIN 52401, the moulding mixture was then processed with a blasting machine to produce test bodies (cores) which were then hardened by gas absorption with dimethyl formal. The carrier gas was air at a temperature of 80° C. and the core boxes were heated to 35° C. The gas absorption time was 2.5 seconds followed by a cleansing time of 15 seconds.

Subsequent examination of the test bodies which were produced in this way revealed the figures given in the attached Table. In this Table, the two main columns "Mixture processed at once" and "Mixture stored for 4 hours" relate to different storage times of the mixture in order to illustrate the excellent sand life. For this, part of the mixture was processed to produce test bodies immediately after the mixture had been prepared while another part was first stored for 4 hours before the test bodies were produced. In both cases, some of the test bodies were tested within 15 seconds (immediately) or within 1 hour following completion of gas absorption, in order to show the satisfactory initial strengths of the test bodies and the development of final strength properties.

EXAMPLE 2

563.6 PW resorcinol, 77 PW water and 3.4 PW zinc acetate were heated in a reactor to 70° C. until an homogeneous solution was obtained. Then, within 1 hour, 103.8 PW formalin (37%) were added, care being taken to ensure that the temperature of 70° C. was not exceeded. 15 mins. after completion of formalin addition, 164 PW resorcinol pitch were stirred in until fully dissolved. Afterwards, the mixture was cooled to about 40° C. and 58.2 PW melamine resin (Luwipal 066) and 30 PW monoethylene glycol and 4 PW amino silane (Dynasilane 1411 of Messrs. Dynamit Nobel) were also added. After brief agitation, an homogeneous solution was produced which will hereinafter be referred to as "resin solution 2".

In a further reactor, 450.6 PW p-phenol sulphonic acid (94%) were made ready and heated to 70° C. until everything had melted. Then within 1½ hours, 49.4 PW formalin (37%) were added, care being taken to ensure that the temperature of 70° C. was not exceeded. 15 mins. after all the formalin had been added, the phenol sulphonic acid precondensate formed was cooled to 40° C. and carefully blended with 500 PW sulphuric acid (96%), once again care being taken to see that the temperature did not rise to levels above 70° C. After brief agitation, an homogeneous solution was obtained, which will subsequently be referred to as "acid 2".

From 100 PW quartz sand H 33, 1.2 PW of resin solution 2 and 0.7 PW of acid 2, a moulding mixture was produced which was then processed with dimethyl formal in the manner described in Example 1 to produce hardened cores. The bending strength properties of these cores are likewise shown in the attached Table.

EXAMPLE 3

In a reactor, 940 PW phenol, 495 PW paraformaldehyde and 15 PW zinc acetate were heated to 80° C. After 15 hours reaction time at this temperature, a phenol resin containing methylol groups was produced, containing about 5% by weight free phenol and about 2% by weight free formaldehyde.

330 PW of this resin were then reacted with 470 PW of an approx. 70% aqueous resorcinol solution in the presence of 3.5 PW oxalic acid, in fact for 1 hour at 80° C. Afterwards, 25 PW resorcinol pitch were added and after cooling to 40° C., 41 PW monoethylene glycol and 33 PW melamine resin (Luwipal 066) and 3.6 PW amino silane were also added. After intensive agitation, an homogeneous solution was produced which will subsequently be termed "resin solution 3".

From 100 PW quartz sand H33, 1 PW resin solution 3 and 0.6 PW cumol sulphonic acid (95%), a moulding mixture was produced which was then processed with dimethyl formal in the manner described in Example 1 to produce hardeend cores. The bending strength properties of these cores are likewise given in the attached Table.

EXAMPLE 4

In a reactor, 330 PW resorcinol, 126 PW melamine, 7.5 PW zinc acetate and 200 PW water were heated to 50° C. until an homogeneous solution resulted. Then, 162 PW formalin (37%) were added and the preparation was maintained at 50° C. until such time as the free formaldehyde level dropped to zero. The result was a solution in which the water content was adjusted (reduced) to 25% by weight by vacuum distillation. This solution was then mixed with 0.3% by weight amino silane and formed "resin solution 4".

From 100 PW quartz sand H33, 1.2 PW resin solution 4 and 0.7 PW acid 2 (according to Example 2), a moulding mixture was produced which was then processed with dimethyl formal in the manner described in Example 1 to produce hardened cores. The bending strengths of these cores are likewise shown in the attached Table.

TABLE

| Mixture Test | Bending strengths in N/sq.cm | | | |
|---|---|---|---|---|
| | Processed immediately | | Stored for 4 hours | |
| | immediate | after 1 h | immediate | after 1 h |
| Example 1 | 250 | 530 | 250 | 510 |
| Example 2 | 300 | 540 | 270 | 680 |
| Example 3 | 180 | 450 | 160 | 420 |
| Example 4 | 210 | 420 | 180 | 400 |

We claim:

1. Cold-setting moulding binder for producing synthetic resin bonded foundry moulds, characterized in that the binder comprises a solution of aldehyde reactive phenol substances and strong acids, and the reaction product of said solution with gaseous acetal, said solution being first mixed with the moulding mixture and shaped, and the gaseous acetal being then passed through the shaped moulding mixture.

2. Binder according to claim 1, characterised in that the aldehyde reactive phenol substances are present in aqueous solution.

3. Binder according to claim 1 or 2, characterised in that the aldehyde reactive phenol substances contain resorcinol and/or a resorcinol product.

4. Binder according to claim 3, characterised in that the resorcinol product is resorcinol pitch.

5. Binder according to claim 3, characterised in that the resorcinol product is a resorcinol-formaldehyde precondensate.

6. Binder according to claim 3, characterised in that the resorcinol product is a phenol-resorcinol-formaldehyde precondensate.

7. Binder according to claim 3, characterised in that a part of the resorcinol or of the resorcinol product is replaced by melamine or a melamine-formaldehyde precondensate.

8. Binder according to one of claims 1 or 2 or 4 or 5 or 6 or 7, characterised in that sulphuric acid and/or sulphonic acids are used as the acid.

9. Binder according to one of claims 1 or 2 or 4 or 5 or 6 or 7, characterised in that readily volatile formals are used as the acetals.

10. Method of producing synthetic resin bonded moulds, particularly foundry moulds, with a binder according to one of claims 1 or 2 or 4 or 5 or 6 or 7, characterised in that from a basic moulding material, the solution of the aldehyde reactive phenol substance and the acid, a moulding mixture is produced and caused to harden by passing acetal through it in a carrier gas.

* * * * *